United States Patent
Hiemstra et al.

(10) Patent No.: US 9,787,169 B2
(45) Date of Patent: Oct. 10, 2017

(54) ELECTROMAGNETIC ACTUATORS AND COMPONENT DESIGNS THEREFOR

(71) Applicant: The Regents of the University of Michigan, Ann Arbor, MI (US)

(72) Inventors: David Hiemstra, Ann Arbor, MI (US); Gaurav Parmar, Ann Abor, MI (US); Cory Welch, Harrison Township, MI (US); Shorya Awtar, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 664 days.

(21) Appl. No.: 14/217,095

(22) Filed: Mar. 17, 2014

(65) Prior Publication Data
US 2014/0265644 A1  Sep. 18, 2014

Related U.S. Application Data

(60) Provisional application No. 61/801,212, filed on Mar. 15, 2013.

(51) Int. Cl.
*H02K 33/00* (2006.01)
*H02K 41/035* (2006.01)
*H02K 33/12* (2006.01)

(52) U.S. Cl.
CPC ......... *H02K 41/0356* (2013.01); *H02K 33/00* (2013.01); *H02K 33/12* (2013.01)

(58) Field of Classification Search
CPC ........ H02K 33/00; H02K 35/02; H02K 33/02; H02K 41/035; H02K 41/0354; H02K 41/0356; H02K 33/12
See application file for complete search history.

(56) References Cited

U.S. PATENT DOCUMENTS

| | | | | |
|---|---|---|---|---|
| 3,135,880 A | * | 6/1964 | Olson | H02K 41/033 310/14 |
| 4,346,318 A | * | 8/1982 | Shtrikman | H02K 33/06 310/12.24 |
| 4,675,563 A | * | 6/1987 | Goldowsky | H02K 33/10 290/1 R |
| 5,654,596 A | * | 8/1997 | Nasar | H02K 35/06 310/12.15 |
| 7,205,686 B2 | * | 4/2007 | Okubo | H02K 41/0356 310/12.26 |
| 2013/0334902 A1 | * | 12/2013 | Oiwa | H02K 33/18 310/20 |

FOREIGN PATENT DOCUMENTS

| | | | | |
|---|---|---|---|---|
| EP | 1263122 A1 | * | 12/2002 | H02K 41/03 |
| WO | 2011058344 A1 | | 5/2011 | |
| WO | 2012172351 A2 | | 12/2012 | |

* cited by examiner

*Primary Examiner* — Burton Mullins
(74) *Attorney, Agent, or Firm* — Reising Ethington P.C.

(57) ABSTRACT

An embodiment of an electromagnetic actuator, such as a moving magnet actuator (MMA), includes a back iron, a first coil winding, a second coil winding, a mover, and a permanent magnet. The first and second coil windings are connected to the back iron, and have generally annular shapes. The mover moves relative to the back iron during use of the MMA. The permanent magnet is connected to the mover and moves with the mover during use of the MMA. The permanent magnet has a generally annular shape.

13 Claims, 9 Drawing Sheets

ELECTROMAGNETIC ACTUATORS AND COMPONENT DESIGNS THEREFOR

CROSS-REFERENCE TO RELATED APPLICATION

This application claims the benefit of U.S. Provisional Application No. 61/801,212, filed Mar. 15, 2013, the entire contents of which are hereby incorporated by reference.

TECHNICAL FIELD

This invention relates to electromagnetic actuators, and more particularly relates to moving magnet actuators (MMAs).

BACKGROUND

Electromagnetic actuators are commonly employed in nano-positioning systems such as scanning probe microscopy and lithography and in other applications. Still, electromagnetic actuators are used in other systems that do not necessarily involve nano-positioning such as robotics, automation, and mechatronics. In general, electromagnetic actuators provide the movement and motion needed in the systems which, in the case of nano-positioning, can also include a flexure bearing, a feedback controller, and a current driver. One type of electromagnetic actuator is what-is-known-as a Lorentz force actuator. Lorentz force actuators cause movement and motion via interaction between one or more current-carrying coil windings and a permanent magnet. Common Lorentz force actuators are moving magnet actuators (MMAs). Shortcomings of previously-known MMAs include performance deficiencies.

SUMMARY

According to one embodiment, an electromagnetic actuator includes a first coil, a second coil winding, and a permanent magnet. The first coil winding has a generally annular shape, and the second coil winding has a generally annular shape. The second coil winding is located radially inside of the first coil winding. The permanent magnet has a generally annular shape and is located radially between the first coil winding and the second coil winding. The permanent magnet moves relative to the first and second coil windings during use of the electromagnetic actuator.

According to another embodiment, an electromagnetic actuator includes a first back iron, a first planar coil winding connected to the first back iron, a second back iron connected to said first back iron, a second planar coil winding connected to the second back iron, a mover moving relative to the first and second back irons during use of the electromagnetic actuator, a first permanent magnet, and a second permanent magnet. The first permanent magnet is connected to the mover and moves with the mover during use of the electromagnetic actuator. The first permanent magnet is located transversely between the first planar coil winding and the second planar coil winding. The second permanent magnet is connected to the mover and moves with the mover during use of the electromagnetic actuator. The second permanent magnet is located transversely between the first planar coil winding and the second planar coil winding.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
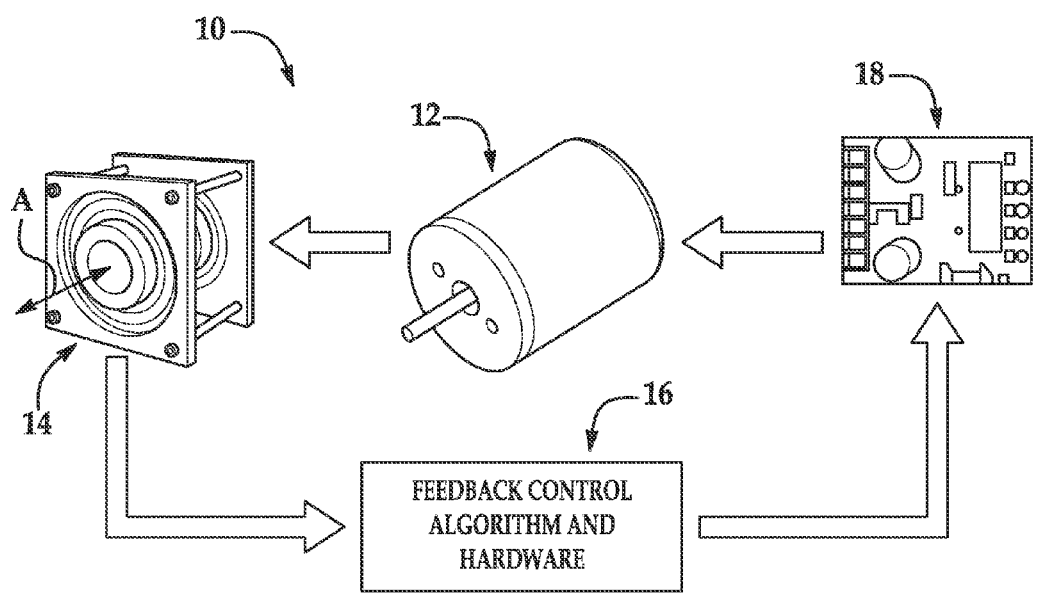
FIG. 1 is a diagrammatic view of an example nano-positioning system.

Referring to the drawings, the figures depict multiple embodiments of electromagnetic actuators and of component designs that can be employed in electromagnetic actuators. The electromagnetic actuators provide the movement and motion needed across a wide spectrum of applications including nano-positioning systems like scanning probe microscopy and lithography, robotic systems, automation systems, and mechatronic systems. In these systems as well as others, the electromagnetic actuators set forth in this description provide a larger range of motion and displacement, a greater speed and force output, improved motion quality, and other performance enhancements compared to previously-known electromagnetic actuators. As an aside, and as used herein, the terms "axial," "radial," and "circumferential" and their related forms—unless otherwise specified—are with respect to the generally cylindrical shape of the electromagnetic actuator such that an axial direction is along or parallel to an axis of the shape, radial is along or parallel to a radius of the shape, and circumferential follows or is in the same direction as a circumference of the shape.

Figure 5A:
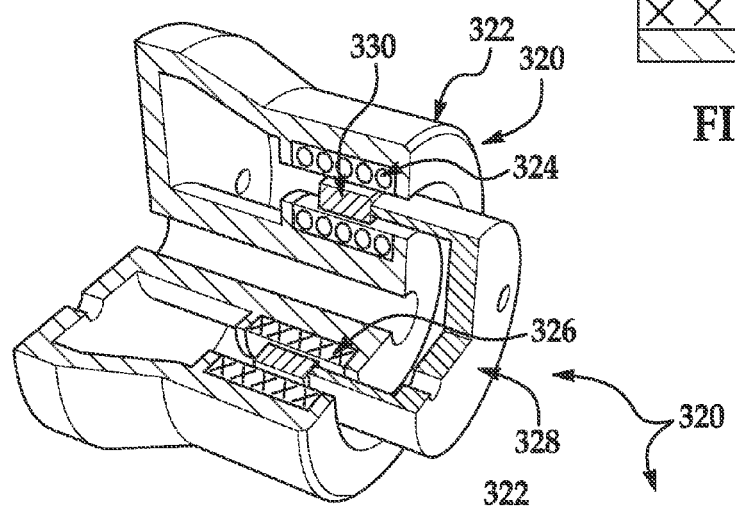
FIG. 5A is a diagrammatic view in perspective and sectional of a fourth embodiment of an electromagnetic actuator.

Also, with the exception of FIG. 5A which is shown in perspective, the electromagnetic actuators illustrated in the figures are shown in sectional profile, and it should be appreciated that, except where indicated otherwise, the sectioned electromagnetic actuators and their components have generally cylindrical and annular shapes similar to that of FIG. 5A.

FIG. 1 illustrates a basic example of a nano-positioning system 10; other examples could differ from what is shown. In the figure, the nano-positioning system 10 includes several components that work together to produce close-loop nano-metric motion—they include an electromagnetic actuator 12, a flexure bearing 14, a feedback controller 16, and a current driver 18. The electromagnetic actuator 12 could be a moving magnet actuator (MMA) like the ones described below. The flexure bearing 14 is mechanically interconnected to the electromagnetic actuator 12 in order to guide translational motion and displacement of the actuator's mover along an axis (commonly along a single-axis A). The feedback controller 16 generally receives inputs concerning the resulting motion and displacement, and outputs command signals to the current driver 18 to control the motion. One or more sensor(s), microcontroller(s), and other hardware can be a part of the feedback controller 16 to perform this function and other functions. The feedback controller 16 can be implemented with suitable algorithms for carrying out its functions. Lastly, the current driver 18 supplies electrical current to the electromagnetic actuator 12.

Figure 2:
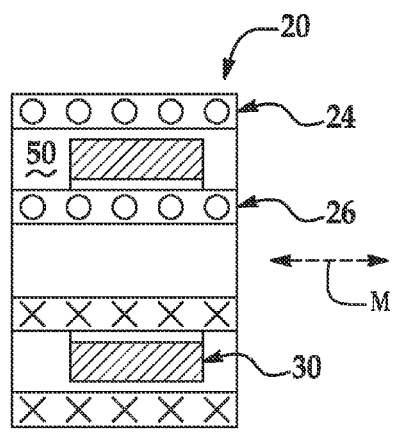
FIG. 2 is a diagrammatic view in sectional of a first embodiment of an electromagnetic actuator.

Referring now to FIG. 2, a first embodiment of an electromagnetic actuator is an MMA 20 illustrated here. In general, the MMA 20 can have different designs and constructions depending upon, among other considerations and factors, the system in which the MMA will be employed. In the first embodiment, the MMA 20 includes a first coil winding 24, a second coil winding 26, and a permanent magnet 30.

When energized with electrical current, the first coil winding 24 generates a magnetic field that interacts with a magnetic field of the permanent magnet 30 to impart movement to the permanent magnet 30. Although shown in sectional profile, the first coil winding 24 has a generally annular and ring-like shape with a continuous circumferential extent. The first coil winding 24 has open axial ends at each of its axial sides. A wrapped wire wound about an axis and around a circumference makes-up the first coil winding 24. The first coil winding 24 is arranged concentric with the second coil winding 26 and concentric with the permanent magnet 30.

When energized with electrical current, the second coil winding 26 generates a magnetic field that interacts with the magnetic field of the permanent magnet 30 to impart movement to the permanent magnet. The second coil winding 26 has a generally annular and ring-like shape with a continuous circumferential extent, and has open axial ends at each of its axial sides. A wrapped wire wound about an axis and around a circumference makes-up the second coil winding 26. The second coil winding 26 is arranged concentric with the first coil winding 24 and concentric with the permanent magnet 30. Compared to the radial extent of the first coil winding 24, the second coil winding 26 has a reduced radial extent and is hence located radially inside of the first coil winding. The first and second coil windings 24, 26 are in-line with each other axially and have a similar axial length. Furthermore, the first and second coil windings 24, 26 oppose and confront each other across a spacing 50 all along their circumferential extents. They confront each other directly at sections where the permanent magnet 30 is absent, and confront each other indirectly at sections where the permanent magnet is present at those sections in the spacing 50. In use, the first and second coil windings 24, 26 remain stationary and static.

The permanent magnet 30 moves relative to the first and second coil windings 24, 26 during use of the MMA 20. The permanent magnet 30 generates a magnetic field that interacts with the magnetic fields of the first and second coil windings 24, 26 to impart its movement. In the embodiments of the figures in which the permanent magnet has a generally annular shape, the permanent magnet is magnetized in a radial direction with respect to its annular shape (this is depicted, for example, in FIG. 4 with the "N" and "S" markings). In the radial direction, the generated magnetic field can be directed radially inward or radially outward, depending on the embodiment. Still, in some embodiments the permanent magnet can be magnetized in an axial direction with respect to its annular shape. The permanent magnet 30 reciprocates back-and-forth along a motion axis M. The motion axis M is concentric with the first and second coil windings 24, 26 and concentric with the permanent magnet 30. Similar to the coil windings, the permanent magnet 30 has a generally annular and ring-like shape with a continuous circumferential extent. In assembly, the permanent magnet 30 is suspended within the spacing 50 radially in-between the first and second coil windings 24, 26 and is concentric with the coil windings. But unlike previously-known MMAs, the permanent magnet 30 in this embodiment has no direct physical connection with a pole piece and—hence with less weight—can more readily reciprocate within the axial extent of the spacing 50 and of the first and second coil windings 24, 26. The improvements and enhancements of this first embodiment over previously-known MMAs will become apparent in the description below accompanying the fourth embodiment (i.e., FIGS. 5A and 5B) of the MMA.

Figure 3:
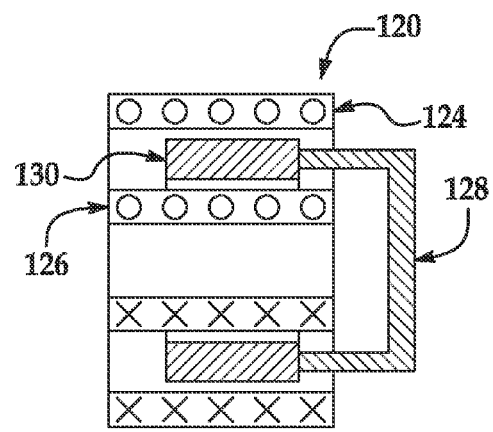
FIG. 3 is a diagrammatic view in sectional of a second embodiment of an electromagnetic actuator.

FIG. 3 shows a second embodiment of an MMA 120. The MMA 120 is similar in some ways to the MMA 20 of the first embodiment, and descriptions of these similarities will not necessarily be repeated for the second embodiment. As before, the MMA 120 includes a first coil winding 124, a second coil winding 126, and a permanent magnet 130. These components are the same as described above for the first embodiment. In this second embodiment, however, the MMA 120 includes a mover 128. The mover 128 is carried by the permanent magnet 130 and moves with it and relative to the first and second coil windings 124, 126 during use of the MMA 120. The mover 128 has a generally cylindrical shape and is concentric with the first and second coil windings 124, 126 and with the permanent magnet 130. In assembly, the mover 128 is connected to the permanent magnet 130. Opposite the permanent magnet 130, the mover 128 may be mechanically interconnected to a bearing such as a flexure bearing to facilitate guided motion of the mover. Again here, the improvements and enhancements of this second embodiment over previously-known MMAs will become apparent in the description below accompanying the fourth embodiment (i.e., FIGS. 5A and 5B) of the MMA.

Figure 4:
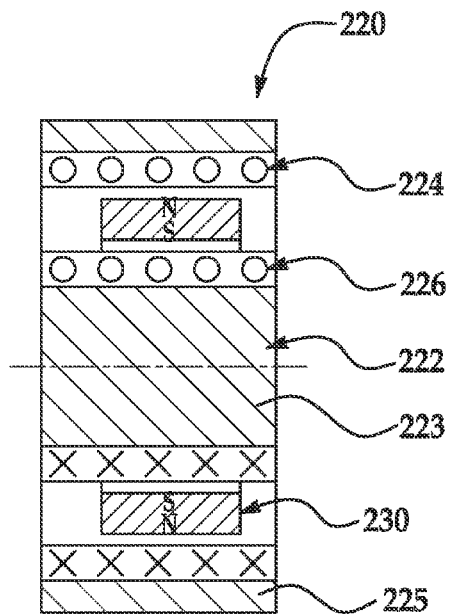
FIG. 4 is a diagrammatic view in sectional of a third embodiment of an electromagnetic actuator.

FIG. 4 shows a third embodiment of an MMA 220. The MMA 220 is similar in some ways to the MMA 20 of the first embodiment, and descriptions of these similarities will not necessarily be repeated for the third embodiment. As before, the MMA 220 includes a first coil winding 224, a second coil winding 226, and a permanent magnet 230. These components are the same as described above for the first embodiment. In this third embodiment, however, the MMA 220 includes a back iron 222. The back iron 222 constitutes the stator of the MMA 220 and remains stationary and static when the MMA is in use. Portions of the back iron 222, such as its inner portion 223, can serve as a pole piece for guiding emitted magnetic flux. In general, the back iron 222 can increase force output due to the provision of a lower reluctance magnetic flux path via the back iron. The back iron 222 is concentric with the first and second coil windings 224, 266 and is concentric with the permanent magnet 230. The back iron 222 has an outer portion or wall 225 and has the inner portion or wall 223 radially-inward of the outer wall. The outer and inner portions 225, 223 are discrete with respect to each other, and both have a generally cylindrical shape. The outer portion 225 is located radially outside of the first coil winding 224, and the inner portion 223 is located radially inside of the second coil winding 226. The back iron 222 has open axial ends at each of its axial sides. Again here, the improvements and enhancements of this third embodiment over previously-known MMAs will become apparent in the description below accompanying the fourth embodiment (i.e., FIGS. 5A and 5B) of the MMA.

Figure 5B:
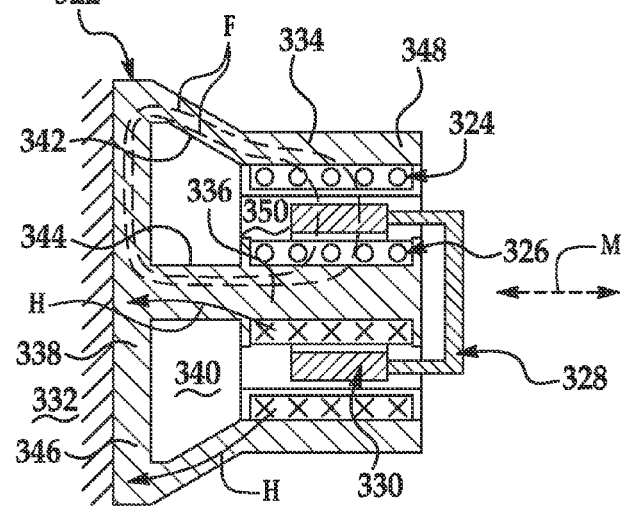
FIG. 5B is a diagrammatic view in sectional of the fourth embodiment of the electromagnetic actuator.

FIGS. 5A and 5B show a fourth embodiment of an MMA 320. The MMA 320 includes a back iron 322, a first coil winding 324, a second coil winding 326, a mover 328, and a permanent magnet 330. The back iron 322 constitutes the stator of the MMA 320 and remains stationary and static when the MMA is being used, and is anchored to a ground 332. Portions of the back iron 322, such as its center portion, serve as a pole piece for guiding emitted magnetic flux F. In general, the back iron 322 can increase force output due to the provision of a lower reluctance magnetic flux path via the back iron. The back iron 322 has a generally cylindrical shape with an outer portion or wall 334, an inner portion or wall 336 radially-inward of the outer wall, and a back wall 338 spanning between the outer and inner walls. The back iron 322 has a somewhat hollow interior 340 defined in part by an inside surface 342 of the outer wall 334 and an outside surface 344 of the inner wall 336, and has a closed axial end 346 at the back wall 338 and an open axial end 348 opposite the back wall. Flanges can project from the inside and outside surfaces 342, 344 to help seat the first and second coil windings 324, 326 against the surfaces. And lead wires can be fed through the walls of the back iron 322 to supply electrical current to the first and second coil windings 324, 326.

The first coil winding 324 is connected to the back iron 322 and, when energized with electrical current, generates a magnetic field that interacts with a magnetic field of the permanent magnet 330 to impart movement to the mover 328. The first coil winding 324 has a generally annular and ring-like shape with a continuous circumferential extent. A wrapped wire wound about an axis and around a circumference makes-up the first coil winding 324. In assembly in this embodiment, the first coil winding 324 is seated directly against the inside surface 342 adjacent the open axial end 348 and spaced axially from the closed axial end 346. The first coil winding 324 is arranged concentric with the back iron's cylindrical shape.

Likewise, the second coil winding 326 is connected to the back iron 322 and, when energized with electrical current, generates a magnetic field that interacts with the magnetic field of the permanent magnet 330 to impart movement to the mover 328. The second coil winding 326 has a generally annular and ring-like shape with a continuous circumferential extent. A wrapped wire wound about an axis and around a circumference makes-up the second coil winding 326. In assembly in this embodiment, the second coil winding 326 is seated directly against the outside surface 344 adjacent the open axial end 348 and is spaced axially from the closed axial end 346. The second coil winding 326 is arranged concentric with the back iron's cylindrical shape and concentric with the first coil winding 324. The second coil winding 326 has a reduced radius compared to the radius of the first coil winding 324. The first and second coil windings 324, 326 are in-line with each other axially and have a similar axial length. Furthermore, the first and second coil windings 324, 326 oppose and confront each other across a spacing 350 all along their circumferential extents. The spacing 350 is a section of the back iron's interior 340. In use, the first and second coil windings 324, 326 remain stationary and static with the back iron 322.

The mover 328 moves relative to the back iron 322 and relative to the first and second coil windings 324, 326 during use of the MMA 320. In particular, the mover 328 reciprocates back-and-forth along a motion axis M and through the open axial end 348 of the back iron 322. The motion axis M is parallel to and in-line with a center axis of the back iron's cylindrical shape, and the mover 328 is concentric with the back iron 322 and with the first and second coil windings 324, 326. Further, the mover 328 has a generally cylindrical shape and is connected to and carries the permanent magnet 330. And opposite the permanent magnet 330, the mover 328 may be mechanically interconnected to a bearing such as a flexure bearing to facilitate guided motion of the mover.

The permanent magnet 330 is carried by the mover 328 and moves with it during use of the MMA 320. The permanent magnet 330 generates a magnetic field that interacts with the magnetic fields of the first and second coil windings 324, 326 to impart movement to the mover 328. Similar to the coil windings, the permanent magnet 330 has a generally annular and ring-like shape with a continuous circumferential extent. In assembly, the permanent magnet 330 is suspended within the spacing 350 radially between the first and second coil windings 324, 326 and is concentric with the coil windings. But unlike previously-known MMAs, the permanent magnet 330 in this embodiment has no direct physical connection with a pole piece and—hence with less weight—can more readily reciprocate within the axial extent of the spacing 350 and of the first and second coil windings 324, 326.

The design and construction of the MMA 320 exhibits several improvements over previously-known MMAs. For one, most previously-known MMAs have permanent magnets that are axially-arranged and do not have an annular and ring-like shape similar to the permanent magnet 330. In part because of their shape and arrangement, the previously-known MMAs typically have a direct physical connection with one or more pole piece(s) to guide emitted magnetic flux, adding weight to its mover and consequently causing performance deficiencies. Removing the pole piece(s) in the previously-known shapes and arrangements would exacerbate what-is-known-as magnetic flux fringing—a behavior in which some of the magnetic flux bleeds beyond an end of an accompanying coil winding and does not pass through the coil winding. When fringing occurs, the previously-known MMAs' force output drops as the permanent magnet approaches the coil winding's end during movement and stroke of the accompanying mover and magnet. Fringing is also described below in connection with the diagrams of FIGS. 14 and 15. The permanent magnet 330 of the fourth embodiment, in contrast, does not have a direct physical connection with one or more pole piece(s) because, by the design and construction of the MMA 320, the emitted magnetic flux F is naturally directed and passes through the first and second coil windings 324, 326. Fringing is therefore minimized or altogether eliminated, and directing the magnetic flux F via one or more pole piece(s) is unnecessary. Without the added weight of the pole piece(s), the dynamic performance (e.g., speed, motion quality) is enhanced.

In addition, compared to previously-known MMAs, the MMA 320 exhibits improved force-stroke uniformity due to its minimized, and in some cases eliminated, magnetic flux fringing. As described above, the MMA 320 does not experience a severe force output drop when the permanent magnet 330 approaches the axial ends of the first and second coil windings 324, 326 during use and movement of the mover 328. As a result, its force output has greater uniformity and is maintained substantially constant throughout the extent of its stroke.

Furthermore, compared to previously-known MMAs, the MMA 320 can have a reduced overall axial length (i.e., measured between the closed and open axial ends 346, 348), and likewise the mover 328 can have a reduced overall axial length. In most previously-known MMAs, its coil windings are arranged in tandem; that is, one coil winding at a first axial position and another coil winding at a second axial position spaced axially away from the first axial position. The axially-spaced coil windings consequently require an increased overall axial length of the previously-known MMAs. In this way too, the previously-known mover is connected to the accompanying permanent magnet via a cantilever support beam lengthened axially outside of the axially-spaced coil windings. The cantilever support beam, however, is susceptible to instability via mechanical moments and loads on the mover, and consequently places greater demands on the accompanying bearing to maintain suitable stability. The mover 328 of the fourth embodiment, in contrast, can have an axial length that is approximately half or shorter than the axial length of the previously-known cantilever support beams; other axial length reductions or possible.

Still further, the MMA 320 of the fourth embodiment exhibits improved off-axis stability. In the previously-known MMAs, the design and arrangement of its permanent magnet and back iron creates considerable attractive forces that pull them toward each other. The attractive forces cause off-axis instability—a behavior also known as sideways snap-in in which the permanent magnet and mover deflect in a side direction away from the motion axis. Again here, greater demands are placed on the accompanying bearing in the previously-known MMAs as a consequence. The MMA 320 described above, in contrast, is designed and arranged such that a sufficient distance separates the permanent magnet 330 and the back iron 322 to minimize the attractive forces between them. Lastly, the MMA 320 exhibits improved heat dissipation, as heat H (FIG. 5B) produced from the first and second coil windings 324, 326 is transferred and dissipated through the back iron 322 due to the direct physical connection between the windings and back iron.

Without wishing to be confined to a particular theory of causation, it is currently believed that all of the above improvements—as well as possibly others—in one way or another contributes to performance enhancements of the MMA 320 compared to what is previously known, including a larger range of motion and displacement, a greater speed and force output, and overall improved motion quality. Not all of the embodiments set forth in this description, or modifications of them, need exhibit all of the improvements and all of the enhancements.

Figure 6:
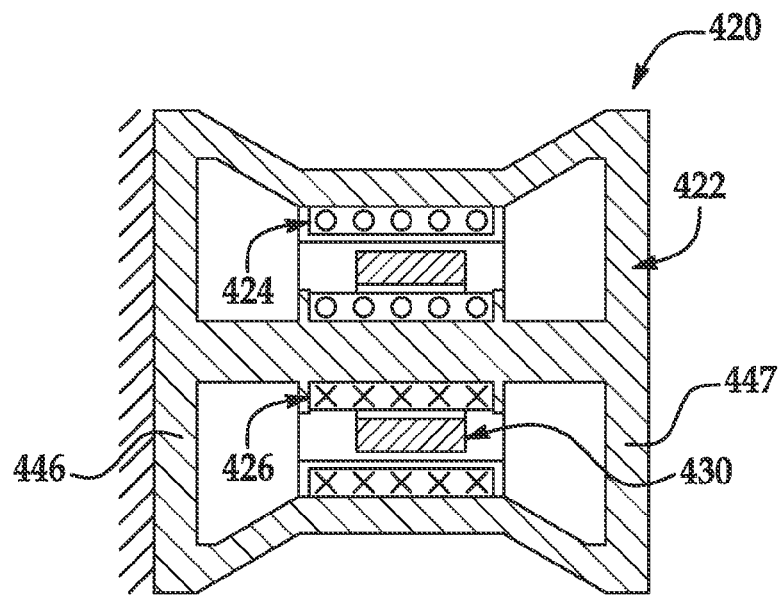
FIG. 6 is a diagrammatic view in sectional of a fifth embodiment of an electromagnetic actuator.

FIG. 6 shows a fifth embodiment of an MMA 420. The MMA 420 is similar in some ways to the MMA 320 of the fourth embodiment, and descriptions of these similarities will not necessarily be repeated for the fifth embodiment. As before, the MMA 420 includes a first coil winding 424, a second coil winding 426, and a permanent magnet 430. Dissimilar in the fifth embodiment, the MMA 420 lacks a discrete mover like that numbered 328 in the fourth embodiment and the MMA 420 has a back iron 422 with closed axial ends 446 and 447 on both of its sides. In this fifth embodiment, the permanent magnet 430 in a sense serves as a mover. Because it has closed axial ends, one or more openings can be formed in the closed axial end 447 for connection with a mover (if mover provided), or for mechanical interconnection with a bearing such as a flexure bearing to facilitate guided motion.

Figure 7:
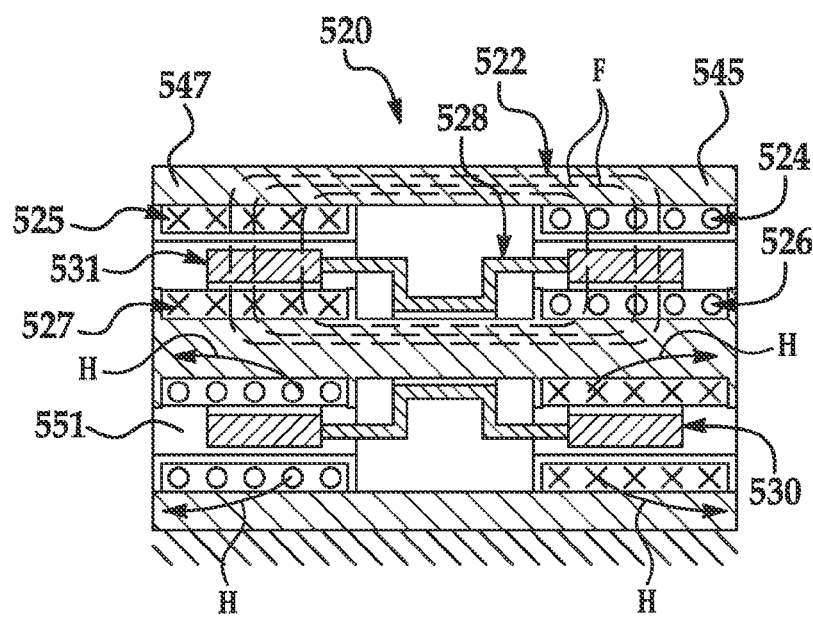
FIG. 7 is a diagrammatic view in sectional of a sixth embodiment of an electromagnetic actuator.

FIG. 7 shows a sixth embodiment of an MMA 520. The MMA 520 is similar in some ways to the MMA 320 of the fourth embodiment, and descriptions of these similarities will not necessarily be repeated for the sixth embodiment. In this embodiment, a third coil winding 525, a fourth coil winding 527, and a second permanent magnet 531 are provided. The third and fourth coil windings 525, 527 are connected to a back iron 522 and, when energized with electrical current, generate a magnetic field that interacts with the magnetic field of the second permanent magnet 531 to impart movement to a mover 528. The third and fourth coil windings 525, 527 have a generally annular and ring-like shape with a continuous circumferential extent. A wrapped wire wound about an axis and around a circumference makes-up each of the third and fourth coil windings 525, 527. The third and fourth coil windings 525, 527 are arranged concentric with the back iron's cylindrical shape, concentric with first and second coil windings 524, 526, and concentric with respect to each other. The third and fourth coil windings 525, 527, however, are spaced an axial distance away from the first and second coil windings 524, 526. The third and fourth coil windings 525, 527 of the sixth embodiment are in-line with each other axially and have a similar axial length, but are not axially in-line with the first and second coil windings 524, 526. Furthermore, the third and fourth coil windings 525, 527 confront and oppose each other across a spacing 551. In use, the third and fourth coil windings 525, 527 remain stationary and static with the back iron 222.

Figure 9:
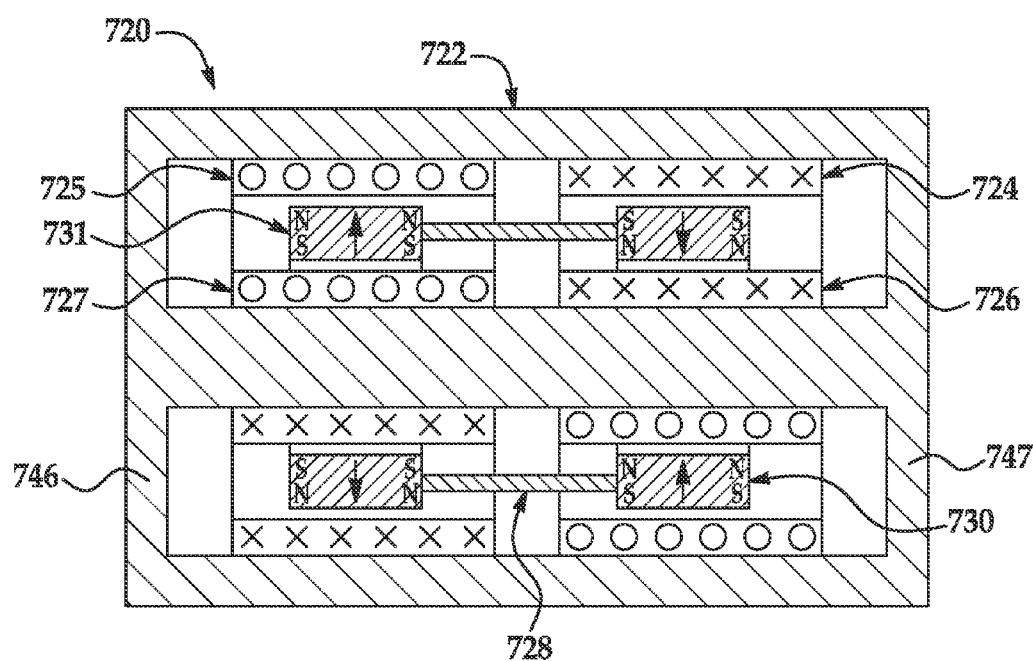
FIG. 9 is a diagrammatic view in sectional of an eighth embodiment of an electromagnetic actuator.

The second permanent magnet 531 is carried by the mover 528 and moves with it during use of the MMA 520. The second permanent magnet 531 generates a magnetic field that interacts with the magnetic fields of the third and fourth coil windings 525, 527 to impart movement to the mover 528. Similar to the coil windings, the second permanent magnet 531 has a generally annular and ring-like shape with a continuous circumferential extent. In assembly, the second permanent magnet 531 is suspended within the spacing 551 radially between the third and fourth coil windings 525, 527 and is concentric with the coil windings. And as before, the second permanent magnet 531 in this sixth embodiment has no direct physical connection with a pole piece. Furthermore, in the sixth embodiment, the back iron 522 has a first open axial end 545 and a second open axial end 547. Alternatives to this sixth embodiment include closing one of the first or second open axial ends 545, 547 to make a closed axial end; or closing both of the first and second open axial ends to provide closed axial ends on both sides of the back iron 522 (this particular alternative is illustrated in FIG. 9 and described below). The MMA 520 of the sixth embodiment may exhibit one or more of the improvements and enhancements described above for the fourth embodiment, as well as the elimination of attractive forces that could otherwise be created from a closed axial end.

Figure 8:
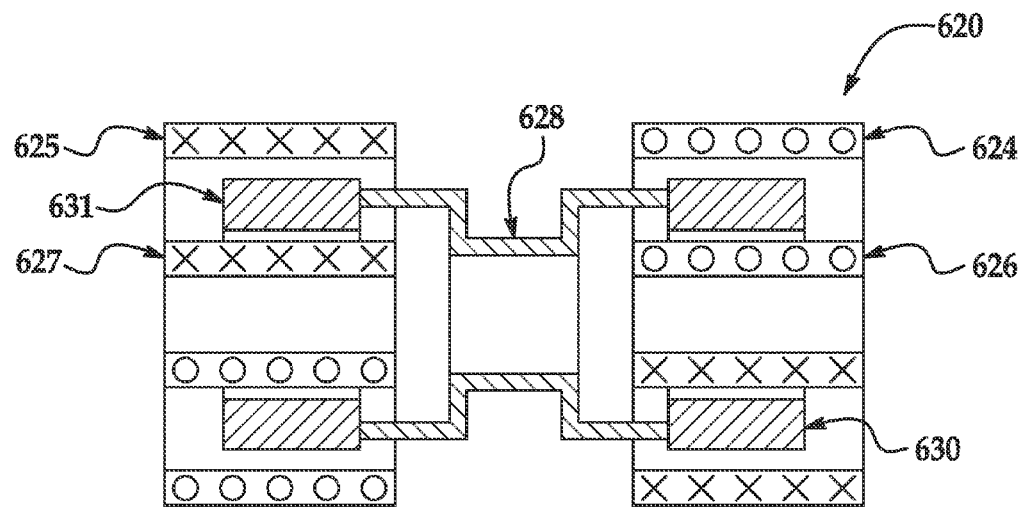
FIG. 8 is a diagrammatic view in sectional of a seventh embodiment of an electromagnetic actuator.

FIG. 8 shows a seventh embodiment of an MMA 620. The MMA 620 is similar in some ways to the MMA 520 of the sixth embodiment, and descriptions of these similarities will not necessarily be repeated for the seventh embodiment. Dissimilar from the sixth embodiment, the seventh embodiment lacks a back iron.

FIG. 9 shows an eighth embodiment of an MMA 720. The MMA 720 is similar in some ways to the MMA 520 of the sixth embodiment, and descriptions of these similarities will not necessarily be repeated for the seventh embodiment. Dissimilar from the sixth embodiment, the eighth embodiment has a back iron 722 with closed axial ends 746 and 747 on both of its sides. Because it has closed axial ends, one or more openings can be formed in the closed axial end 746 or 747 for connection with another mover (if one is provided), or for interconnection with a bearing such as a flexure bearing to facilitate guided motion. It has been found in simulation results that the eighth embodiment exhibits a low risk of magnetic flux saturation, which contributes to performance enhancements. Without wishing to be confined to a particular theory of causation, it is currently believed that its closed axial ends provide the low risk of magnetic flux saturation.

Figure 10:
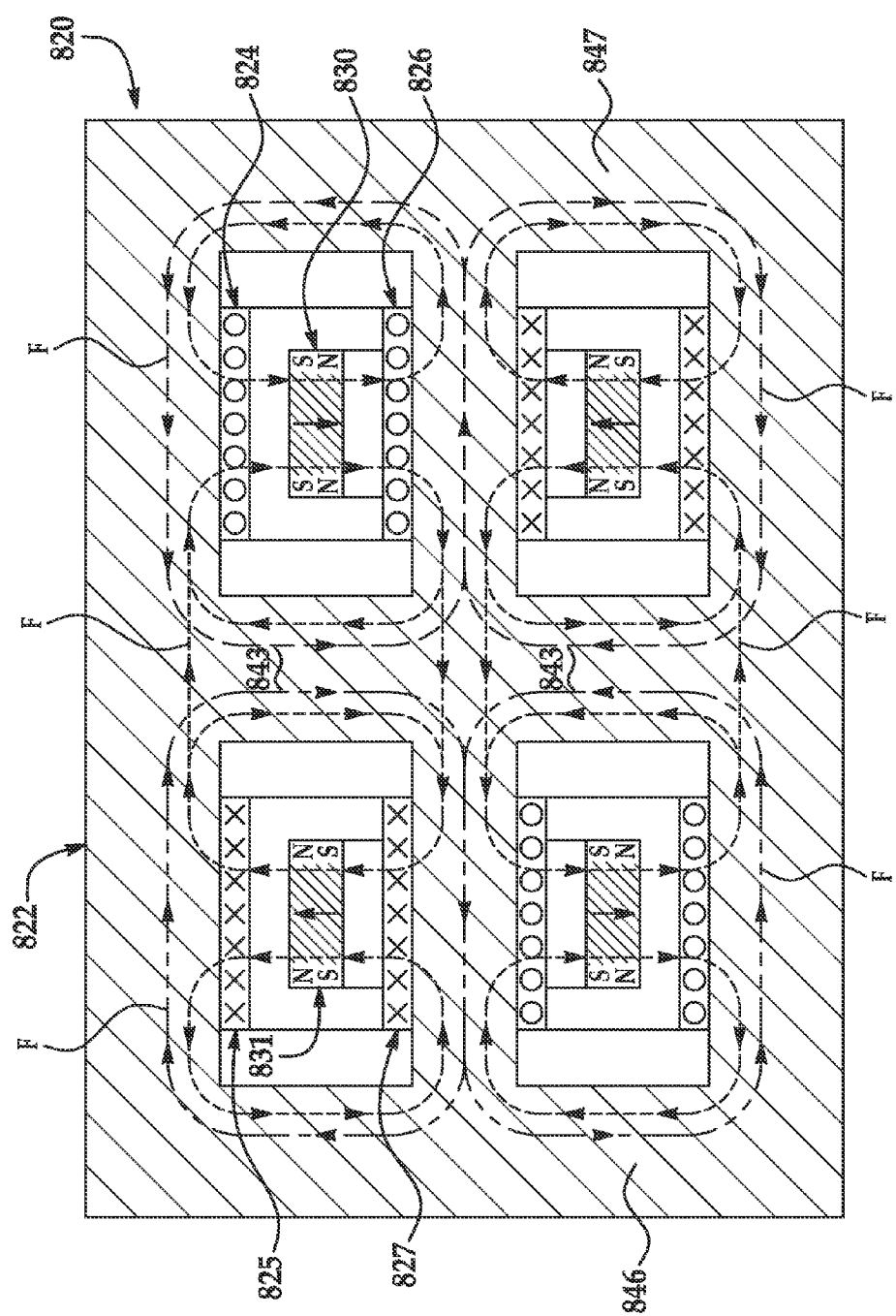
FIG. 10 is a diagrammatic view in sectional of a ninth embodiment of an electromagnetic actuator.

FIG. 10 shows a ninth embodiment of an MMA 820. The MMA 820 is similar in some ways to the MMA 720 of the eighth embodiment, and descriptions of these similarities will not necessarily be repeated for the ninth embodiment. Dissimilar from the eighth embodiment, the ninth embodiment has a back iron 822 with a closed axial middle portion 843 between first and second permanent magnets 830, 831. The ninth embodiment also lacks a mover.

Figure 11:
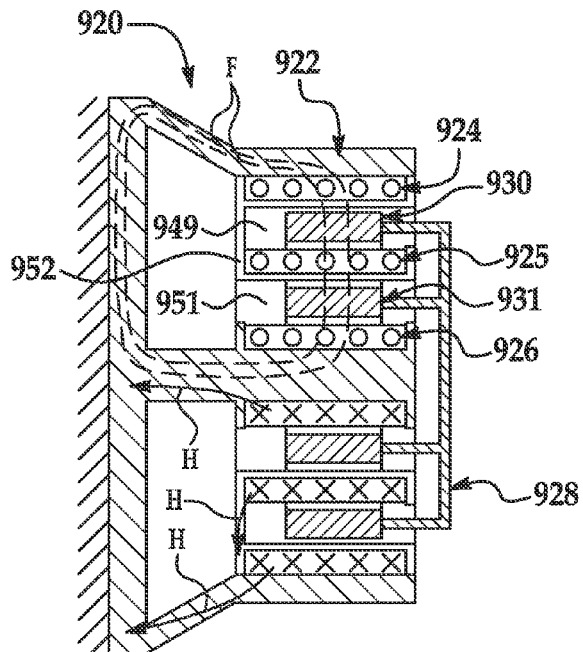
FIG. 11 is a diagrammatic view in sectional of a tenth embodiment of an electromagnetic actuator.

FIG. 11 shows a tenth embodiment of an MMA 920. The MMA 920 is similar in some ways to the MMA 320 of the fourth embodiment, and descriptions of these similarities will not necessarily be repeated for the tenth embodiment. In this embodiment, a third coil winding 925 and a second permanent magnet 931 are provided. Like the first and second coil windings 324, 326 of the fourth embodiment, the third coil winding 925 is indirectly connected to a back iron 922 via a bobbin 952 extending from the back iron and, when energized with electrical current, generates a magnetic field that interacts with the magnetic field of a first permanent magnet 930 and of the second permanent magnet 931 to impart movement to a mover 928. The third coil winding 925 has a generally annular and ring-like shape with a continuous circumferential extent. A wrapped wire wound about an axis and around a circumference makes-up the third coil winding 925. In assembly in the tenth embodiment, the third coil winding 925 is seated against the bobbin 952 or other projection of the back iron 922. The third coil winding 925 is arranged concentric with the back iron's cylindrical shape and concentric with first and second coil windings 924, 926. The third coil winding 925 has an intermediate radius compared to the radii of the first and second coil windings 924, 926. The first, second, and third coil windings 924, 926, 925 of the tenth embodiment are in-line with one another axially and have a similar axial length. Furthermore, the third coil winding 925 confronts and opposes both of the first and second coil windings 924, 926 across a first spacing 949 and a second spacing 951. In use, the third coil winding 925 remains stationary and static with the back iron 922.

The second permanent magnet 931 is carried by the mover 928 and moves with it during use of the MMA 920. The second permanent magnet 931 generates a magnetic field that interacts with the magnetic fields of the first, second, and third coil windings 924, 926, 925 to impart movement to the mover 928. Similar to the coil windings, the second permanent magnet 931 has a generally annular and ring-like shape with a continuous circumferential extent. In assembly, the second permanent magnet 931 is suspended within the second spacing 951 radially between the second and third coil windings 926, 925 and is concentric with the coil windings. Here too, the first permanent magnet 930 is suspended within the first spacing 949 radially between the first and third coil windings 924, 925. And as before, the second permanent magnet 931 in this tenth embodiment has no direct physical connection with a pole piece.

The MMA 920 of the tenth embodiment may exhibit one or more of the improvements and enhancements described above for the fourth embodiment, as well as an increasingly uniformed magnetic flux between the first and second permanent magnets 930, 931, resulting in an even greater force output and improved force-stroke uniformity.

Figure 12:
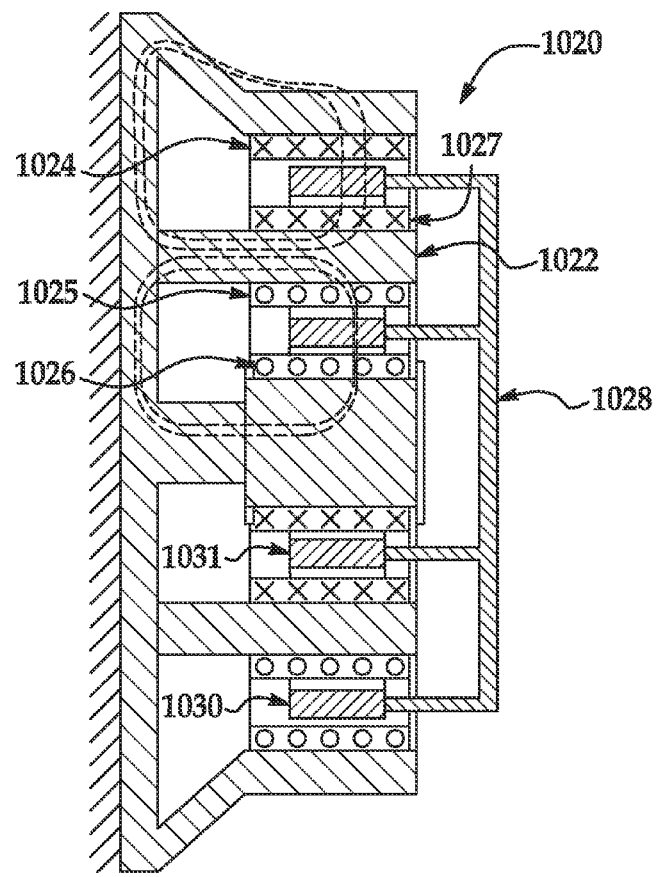
FIG. 12 is a diagrammatic view in sectional of an eleventh embodiment of an electromagnetic actuator.

FIG. 12 shows an eleventh embodiment of an MMA 1020. The MMA 1020 is similar in some ways to the MMA 920 of the tenth embodiment, and descriptions of these similarities will not necessarily be repeated for the eleventh embodiment. Dissimilar from the tenth embodiment, the eleventh embodiment includes a fourth coil winding 1027 that is connected to an inner portion of a back iron 1022.

Figure 13:
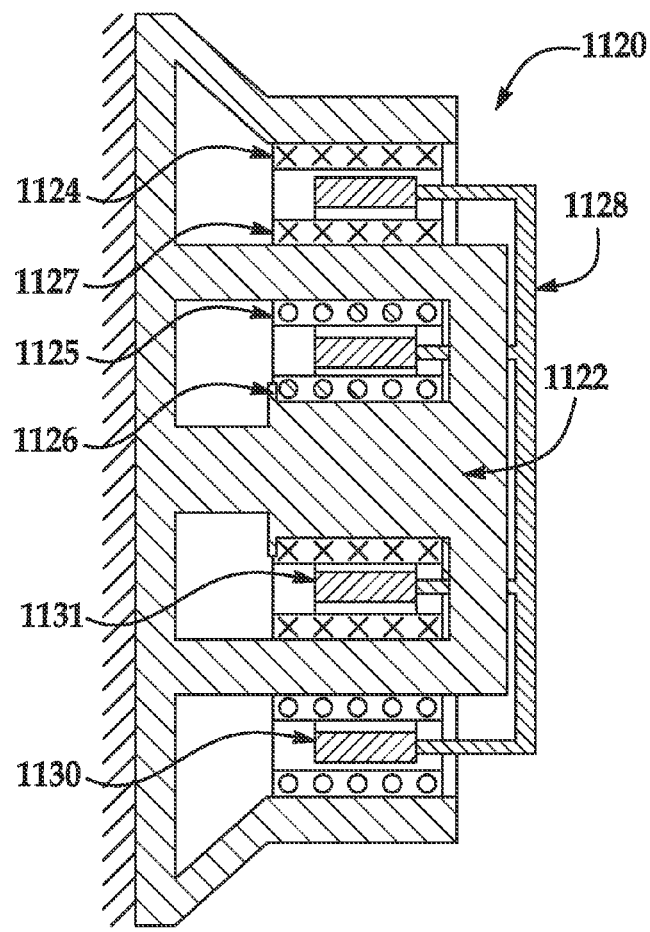
FIG. 13 is a diagrammatic view in sectional of a twelfth embodiment of an electromagnetic actuator.

FIG. 13 shows a twelfth embodiment of an MMA 1120. The MMA 1120 is similar in some ways to the MMA 920 of the tenth embodiment, and descriptions of these similarities will not necessarily be repeated for the twelfth embodiment. Dissimilar from the tenth embodiment, the twelfth embodiment has a back iron 1122 with closed axial ends at its second and third coil windings 1126, 1125 and at its second permanent magnet 1131. And a mover 1128 extends through openings defined in the closed axial ends of the back iron 1122 for connection with the second permanent magnet 1131.

Figure 14:
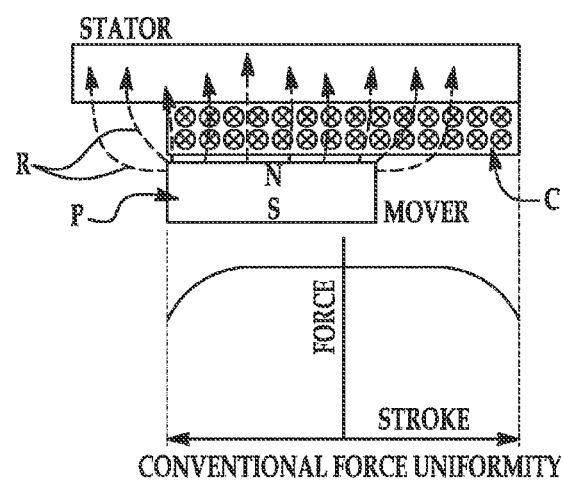
FIG. 14 is a diagrammatic view of a previously-known coil winding, along with an accompanying graph plotting force and stroke.
Figure 15:
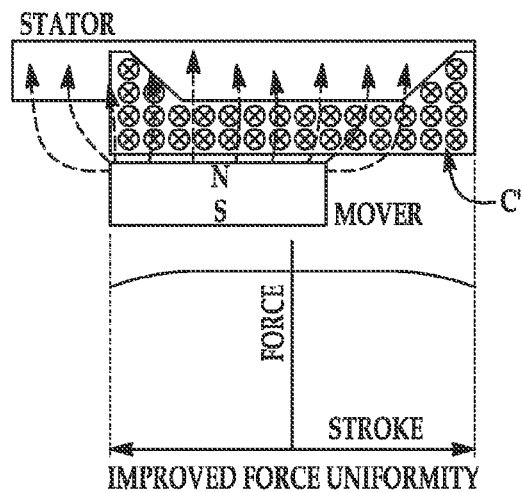
FIG. 15 is a diagrammatic view of an embodiment of a coil winding, along with an accompanying graph plotting force and stroke.

FIG. 14 shows a previously-known coil winding C, and FIG. 15 shows an embodiment of a design of a coil winding C' that can be implemented in any of the coil windings of the embodiments described herein. Compared to the previously-known coil winding C, the coil winding C' is designed to exhibit an improved force-stroke uniformity. Referring particularly to FIG. 14, the coil winding C has wrapped wire wound at a constant radial height across its axial length. During use, the accompanying MMA experiences magnetic flux fringing in which magnetic flux R bleeds beyond an end of the coil winding C and does not pass through the coil winding. As demonstrated in the graph below the coil winding C in FIG. 14, force output consequently drops as the permanent magnet P approaches the ends of the coil winding C. To diminish these adverse effects and yield an improved force-stroke uniformity, the coil winding C' of FIG. 15 has additional wire wrapped at its ends and thereby has a greater radial height at the ends. Increased resulting output force at the ends makes-up and compensates for the magnetic flux fringing that occurs—this is demonstrated in the graph below the coil winding C' in FIG. 15.

Figure 16:
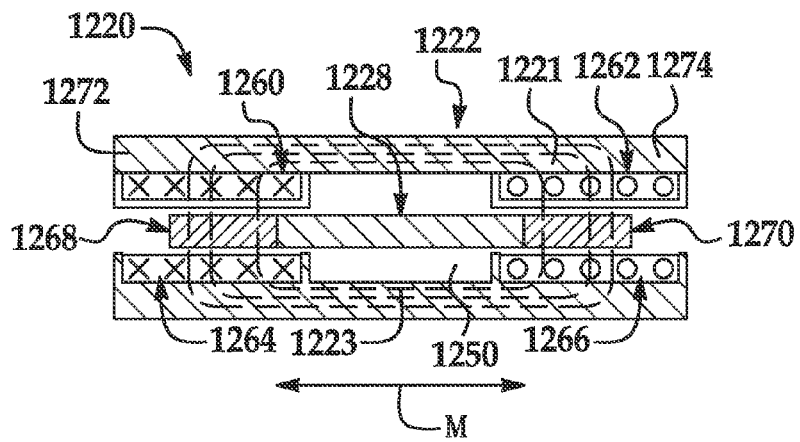
FIG. 16 is a diagrammatic view in sectional of a thirteenth embodiment of an electromagnetic actuator.

FIG. 16 shows a sectional profile of a thirteenth embodiment of an MMA 1220. The MMA 1220 is similar in some ways to the MMA 320 of the fourth embodiment, and descriptions of these similarities will not necessarily be repeated for the thirteenth embodiment.

In this embodiment, the MMA 1220 does not have the generally cylindrical shape of previous embodiments, and rather the MMA of the thirteenth embodiment has a generally planar arrangement and configuration. That being so, the MMA 1220 includes a back iron 1222 having a first planar piece 1221 and a second planar piece 1223, a first section 1260 of a first planar coil winding, a second section 1262 of the first planar coil winding, a first section 1264 of a second planar coil winding, a second section 1266 of the second planar coil winding, a mover 1228, a first bar permanent magnet 1268, and a second bar permanent magnet 1270. Although depicted as separate in the figure, the first and second planar pieces 1221, 1223 are connected to each other tranversely (i.e., connected to each other vertically up and down in the figure). The first and second planar pieces 1221, 1223 oppose and confront each other across a spacing 1250. On one or more of its sides, the back iron 1222 can be open; in the sectional profile of FIG. 16, a first open axial end 1272 and a second open axial end 1274 are shown.

The first and second sections 1260, 1262 of the first planar coil winding are connected to the first planar piece 1221, and the first and second sections 1264, 1266 of the second planar coil winding are connected to the second planar piece 1223. The first and second sections 1260, 1262 of the first planar coil winding are shown as separate in the figure since the figure is in sectional, but actually the first and second sections 1260, 1262 are actually part of the larger first planar coil winding and are not separate from each other; that is, the first planar coil winding when viewed from above and not in sectional would be a continuous planar and somewhat oval or circular shape. This is also true for the first and second sections 1264, 1266 of the second planar coil winding. Particularly, the first and second sections 1260, 1262 are connected to an inside surface of the first planar piece 1221, and the first and second sections 1264, 1266 are connected to an inside surface of the second planar piece 1223. And as before, when energized with electrical current, a magnetic field is generated from the planar coil windings that interacts with a magnetic field of the first and second bar permanent magnets 1268, 1270 to impart movement to the mover 1228. In this embodiment, the generated magnetic field is directed tranversely (i.e., vertically up and down in the figure) between the first and second planar coil windings. In assembly in the thirteenth embodiment, the first and second planar coil windings oppose and confront each other across the spacing 1250. Each planar coil winding can be made up of a wire wound on a plane in a desired pattern, and can be made up of stacked layers of wires wound on different planes. The mover 1228 moves relative to the back iron 1222 and relative to the planar coil windings along a single motion axis M.

The first and second bar permanent magnets 1268, 1270 are carried by the mover 1228 and move with it during use of the MMA 1220. The first and second bar permanent magnets 1268, 1270 generate a magnetic field that interacts with the magnetic fields of the planar coil windings to impart movement to the mover 1228. The bar permanent magnets 1268, 1270 each has a generally rectangular shape. In assembly, the first bar permanent magnet 1268 is suspended within the spacing 1250 transversely between the first and second planar coil windings; and the second bar permanent magnet 1270 is suspended within the spacing transversely between the first and second planar coil windings. And as before, the first and second bar permanent magnets 1268, 1270 have no direct physical connection with a pole piece.

The MMA 1220 of the thirteenth embodiment may exhibit one or more of the improvements and enhancements described above for the other embodiments, as well as limited or altogether eliminated magnetic flux fringing and eliminated attractive forces that could otherwise be created from a closed axial end.

Figure 17:
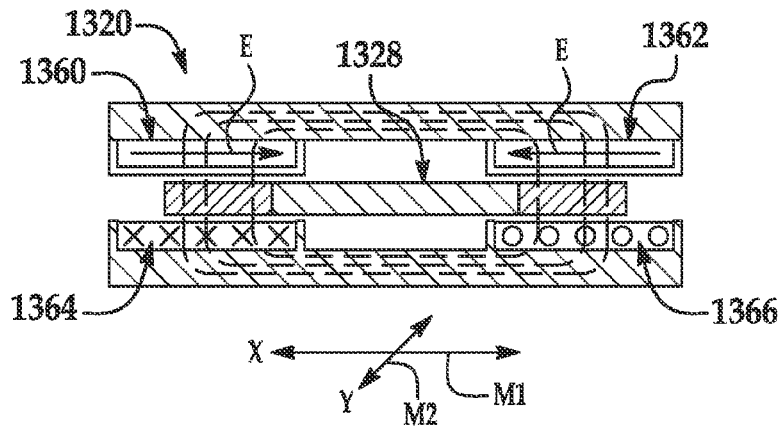
FIG. 17 is a diagrammatic view in sectional of a fourteenth embodiment of an electromagnetic actuator.

FIG. 17 shows a sectional profile of a fourteenth embodiment of an MMA 1320. The MMA 1320 is similar in some ways to the MMA 1220 of the thirteenth embodiment, and descriptions of these similarities will not necessarily be repeated for the fourteenth embodiment. In this embodiment, a mover 1328 is capable of moving along a first motion axis M1 and along a second motion axis M2 that is orthogonal to the first motion axis. This can be achieved by rotating first and second sections 1360, 1362 of the first planar coil winding ninety degrees (90°) from their orientation in the thirteenth embodiment of FIG. 16, or by rotating first and second sections 1364, 1366 of the second planar coil winding ninety degrees from their orientation in the thirteenth embodiment. In the example of FIG. 17, the first and second sections 1360, 1362 are rotated ninety degrees and their electrical current E flows in the direction of the first motion axis M1. When electrical current is supplied to the first and second sections 1360, 1362, the mover 1328 moves along the first motion axis M1; and when electrical current is supplied to the first and second sections 1364, 1366, the mover moves along the second motion axis M2. By concurrently supplying electrical current in different amounts to the first and second sections 1360, 1362, 1364, 1366, the mover 1328 can move in all positions and directions in a two-dimensional plane defined by the first and second motion axes M1, M2, including different angular positions and directions.

Figure 18:
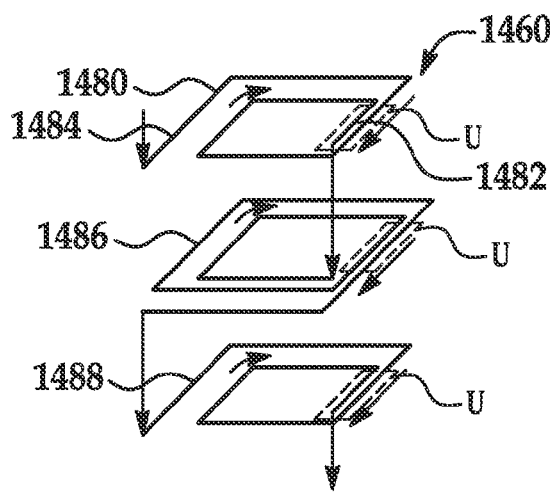
FIG. 18 is a diagrammatic view of an embodiment of a multi-layer planar coil winding.
Figure 19:
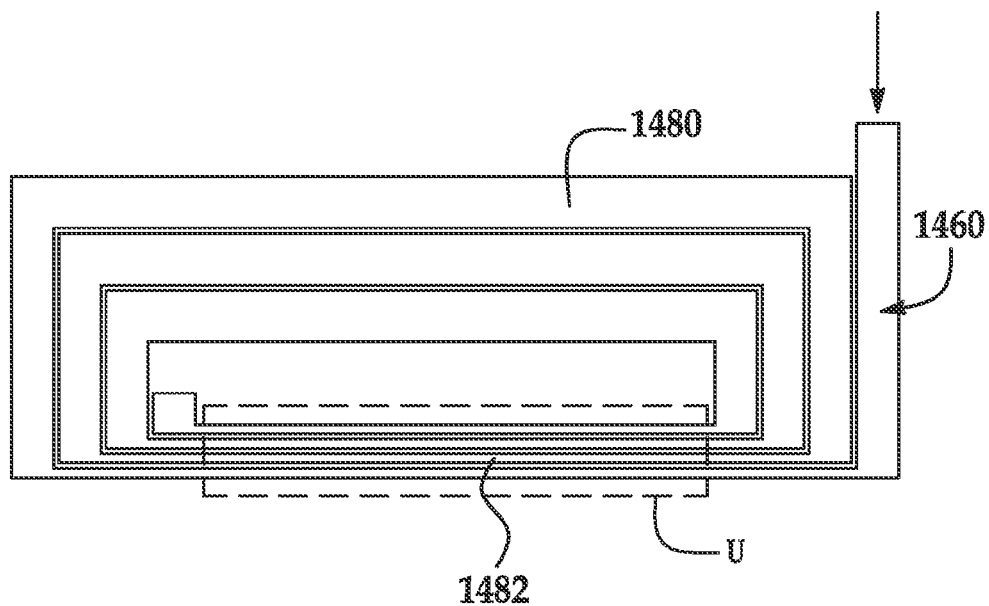
FIG. 19 is a diagrammatic view of an embodiment of a planar coil winding.

FIGS. 18 and 19 show embodiments of a design of a planar coil winding 1460 that can be implemented in any of the planar coil windings of the thirteenth and fourteenth embodiments. Compared to previously-known planar coil windings, the design of FIGS. 18 and 19 increases efficiency of the planar coil winding 1460 and can be more readily manufactured. It has been found that certain sections of a planar coil winding are not utilized to produce force output in the accompanying electromagnetic actuator, while only certain sections contribute to force output. In FIGS. 18 and 19, the utilized sections of the planar coil winding 1460 are demarcated by broken lines U. To reduce resistance in the non-utilized sections, individual coil winding paths 1480 are designed wider with a larger cross-sectional area; and conversely, individual coil winding paths 1482 in the utilized sections U are designed narrower with a comparatively smaller cross-sectional area. The reduced resistance at the non-utilized sections increases the overall efficiency of the planar coil winding 1460. Moreover, FIG. 18 illustrates an embodiment of stacked coil winding layers 1484, 1486, 1488 of the planar coil winding 1460. The first coil winding layer 1484 is wound in a first outward-to-inward direction (e.g., clockwise); the second coil winding layer 1486 is wound in an opposite second outward-to-inward direction (e.g., counterclockwise); and the third coil winding layer 1488 is wound in the first outward-to-inward direction. This winding pattern among the layers can be repeated for a desired number of coil winding layers, and insulating layers can be inserted and placed in between pairs of overlapping coil winding layers. The winding pattern facilitates consistent electrical current flow direction in the planar coil winding 1460 from layer-to-layer—in this example, clockwise electrical current flow. This too contributes to increased efficiency. Lastly, the planar coil winding 1460 can be manufactured with known processes and equipment. For instance, in macro applications, water jet cutting or CNC milling can be used; and in micro applications, etching processes can be used.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electromagnetic actuator, comprising:
 a first coil winding having a generally annular shape;
 a second coil winding having a generally annular shape, said second coil winding located radially inside of said first coil winding;
 a permanent magnet having a generally annular shape and located radially between said first coil winding and said second coil winding, said permanent magnet moving relative to said first and second coil windings and moving solely within an axial extent provided between axial ends of said first and second coil windings during use of the electromagnetic actuator;
 a mover connected to said permanent magnet and moving with said permanent magnet relative to said first and second coil windings during use of the electromagnetic actuator; and
 a stationary back iron having a closed axial end and having an open axial end through which said mover extends, wherein said closed axial end serves as a magnetic flux path and said open axial end lacks a magnetic flux path via said back iron, and wherein, during use of the electromagnetic actuator, emitted magnetic flux passes through said closed axial end.

2. An electromagnetic actuator as set forth in claim 1, wherein said back iron has an outer portion that is generally cylindrical and has an inner portion that is generally cylindrical and is located radially-inwardly of said outer portion, said first coil winding is connected to said outer portion and said second coil winding is connected to said inner portion.

3. An electromagnetic actuator as set forth in claim 1, further comprising:
 a third coil winding having a generally annular shape and located axially away from said first coil winding;
 a fourth coil winding having a generally annular shape, said fourth coil winding located radially inside of said third coil winding, said fourth coil winding located axially away from said second coil winding;
 a second permanent magnet having a generally annular shape and located radially between said third coil winding and said fourth coil winding, said second permanent magnet moving relative to said third and fourth coil windings during use of the electromagnetic actuator; and
 said mover connected to said second permanent magnet, said mover moving with said first and second permanent magnets during use of the electromagnetic actuator.

4. An electromagnetic actuator as set forth in claim 3, said back iron having an outer portion that is generally cylindrical and having an inner portion that is generally cylindrical and is located radially-inwardly of said outer portion, said first coil winding and said third coil winding connected to said outer portion, said second coil winding and said fourth coil winding connected to said inner portion.

5. An electromagnetic actuator as set forth in claim 1, further comprising:
 said back iron connected to said first coil winding and connected to said coil winding;
 a third coil winding indirectly connected to said back iron, said third coil winding having a generally annular shape and located radially between said first coil winding and said second coil winding; and
 a second permanent magnet connected to said mover and moving with said mover during use of the electromagnetic actuator, said second permanent magnet having a generally annular shape and located radially between said second coil winding and said third coil winding, said first permanent magnet located radially between said first coil winding and said third coil winding.

6. An electromagnetic actuator as set forth in claim 1, further comprising:
 said back iron connected to said first coil winding and connected to said second coil winding;
 a third coil winding connected to said back iron, said third coil winding having a generally annular shape and located radially between said first coil winding and said second coil winding;
 a fourth coil winding connected to said back iron, said fourth coil winding having a generally annular shape and located radially between said first coil winding and said third coil winding; and
 a second permanent magnet connected to said mover and moving with said mover during use of the electromagnetic actuator, said second permanent magnet having a generally annular shape and located radially between said second coil winding and said third coil winding, said first permanent magnet located radially between said first coil winding and said fourth coil winding.

7. An electromagnetic actuator as set forth in claim 1, wherein said first coil winding, said second coil winding, or both, has an axial end with a greater number of individual coil windings than the number of individual coil windings away from said axial end.

8. An electromagnetic actuator as set forth in claim 1, wherein said first coil winding and said second coil winding are concentric with respect to each other, said permanent magnet is concentric with respect to said first coil winding and said second coil winding, and said first coil winding and said second coil winding generally confront each other across a spacing, and said permanent magnet is located within said spacing radially between said first coil winding and said second coil winding and moves in said spacing during use of the electromagnetic actuator.

9. An electromagnetic actuator as set forth in claim 1, wherein said permanent magnet is magnetized in a radial direction relative to the generally annular shape of said permanent magnet.

10. An electromagnetic actuator as set forth in claim 1, wherein said back iron has a hollow interior defined at least in part by an inside surface of said outer portion, by an outside surface of said inner portion, and by a back wall of said closed axial end.

11. An electromagnetic actuator comprising:
a first coil winding having a generally annular shape;
a second coil winding having a generally annular shape, said second coil winding located radially inside of said first coil winding;
a permanent magnet having a generally annular shape and located radially between said first coil winding and said second coil winding, said permanent magnet moving relative to said first and second coil windings during use of the electromagnetic actuator;
a third coil winding having a generally annular shape and located axially away from said first coil winding;
a fourth coil winding having a generally annular shape, said fourth coil winding located radially inside of said third coil winding, said fourth coil winding located axially away from said second coil winding;
a second permanent magnet having a generally annular shape and located radially between said third coil winding and said fourth coil winding, said second permanent magnet moving relative to said third and fourth coil windings during use of the electromagnetic actuator;
a mover connected to said first permanent magnet and connected to said second permanent magnet, said mover moving with said first and second permanent magnets during use of the electromagnetic actuator; and
a stationary back iron, said back iron having an outer portion that is generally cylindrical and having an inner portion that is generally cylindrical and is located radially-inwardly of said outer portion, said first coil winding and said third coil winding connected to said outer portion, said second coil winding and said fourth coil winding connected to said inner portion, wherein said back iron has a first open axial end and has a second open axial end opposite said first open axial end.

12. A moving magnet actuator, comprising:
a first coil winding having a generally annular shape;
a second coil winding having a generally annular shape, said second coil winding located radially inside of said first coil winding;
a first permanent magnet having a generally annular shape and located radially between said first coil winding and said second coil winding, said first permanent magnet moving relative to said first and second coil windings during use of the electromagnetic actuator;
a third coil winding having a generally annular shape and located axially away from said first coil winding;
a fourth coil winding having a generally annular shape, said fourth coil winding located radially inside of said third coil winding, said fourth coil winding located axially away from said second coil winding;
a second permanent magnet having a generally annular shape and located radially between said third coil winding and said fourth coil winding, said second permanent magnet moving relative to said third and fourth coil windings during use of the electromagnetic actuator;
a mover connected to said first permanent magnet and connected to said second permanent magnet, said mover moving with said first and second permanent magnets during use of the electromagnetic actuator; and
a stationary back iron, said back iron having an outer portion that is generally cylindrical and having an inner portion that is generally cylindrical and is located radially-inwardly of said outer portion, said first coil winding and said third coil winding connected to said outer portion, said second coil winding and said fourth coil winding connected to said inner portion, said back iron having a first closed axial end and having a second closed axial end opposite said first closed axial end, wherein said first closed axial end serves as a magnetic flux path and said second closed axial end serves as a magnetic flux path.

13. A moving magnet actuator as set forth in claim 12, wherein said back iron has a closed axial middle portion located between said first and second permanent magnets, said closed axial middle portion serving as a magnetic flux path.

\* \* \* \* \*